United States Patent
Maruta et al.

(10) Patent No.: US 7,868,951 B2
(45) Date of Patent: Jan. 11, 2011

(54) PANEL TYPE TELEVISION AND LCD TELEVISION

(75) Inventors: Naoto Maruta, Osaka (JP); Akira Yokawa, Osaka (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 1120 days.

(21) Appl. No.: 11/583,218

(22) Filed: Oct. 18, 2006

(65) Prior Publication Data

US 2007/0091223 A1 Apr. 26, 2007

(30) Foreign Application Priority Data

Oct. 21, 2005 (JP) ........................ 2005-008747 U

(51) Int. Cl.
*H04N 3/14* (2006.01)

(52) U.S. Cl. ...................................... 348/794

(58) Field of Classification Search ................ 348/794, 348/790–792, 836, 787, 789, 785; 353/28, 353/30, 98, 97; 345/87, 204
See application file for complete search history.

(56) References Cited

U.S. PATENT DOCUMENTS

| | | | |
|---|---|---|---|
| 4,646,349 A | | 2/1987 | Puls |
| 4,809,078 A | * | 2/1989 | Yabe et al. ................... 348/794 |
| 4,848,875 A | | 7/1989 | Baughman et al. |
| 5,432,626 A | | 7/1995 | Fujita et al. |
| 5,442,470 A | | 8/1995 | Hashimoto |
| 5,639,151 A | * | 6/1997 | McNelley et al. ............. 353/98 |
| 7,477,328 B2 | * | 1/2009 | Maruta ........................ 348/797 |
| 7,595,847 B2 | * | 9/2009 | Chou et al. ................. 348/790 |
| 2002/0043607 A1 | | 4/2002 | Tajima |
| 2002/0153836 A1 | | 10/2002 | Oishi et al. |
| 2003/0020841 A1 | * | 1/2003 | Takeda ....................... 348/839 |
| 2005/0116644 A1 | | 6/2005 | Kim |
| 2005/0117304 A1 | | 6/2005 | Kim |
| 2005/0151451 A1 | | 7/2005 | Chen et al. |
| 2005/0180098 A1 | | 8/2005 | Kim |

(Continued)

FOREIGN PATENT DOCUMENTS

EP 0985949 A 3/2000

(Continued)

OTHER PUBLICATIONS

The extended European search report, dated Jul. 9, 2009.

*Primary Examiner*—Paulos M Natnael
(74) *Attorney, Agent, or Firm*—Yokoi & Co., U.S.A., Inc.; Toshiyuki Yokoi

(57) ABSTRACT

Since size and mounting method of display panels of a large-sized panel type television differ by manufacturers, different parts are needed for display panels of different manufacturers. The display panel fixing plate is separated into a panel top fixing plate, a panel bottom fixing plate, and a bridge plate. The panel top fixing plate is fixed to the upper side of a flat display panel and the panel bottom fixing plate to the lower side of the flat display panel, and both plates are held with two bridge members. In addition, by making a screw hole vertically oblong that is used for screwing the bridge member to the panel top fixing plate, it is possible use the same panel top fixing plate, the panel bottom fixing plate, and the bridge plate for different inch display panels.

7 Claims, 11 Drawing Sheets

U.S. PATENT DOCUMENTS

| | | |
|---|---|---|
| 2005/0212982 A1 | 9/2005 | Soga |
| 2007/0018919 A1* | 1/2007 | Zavracky et al. .............. 345/87 |

FOREIGN PATENT DOCUMENTS

| | | |
|---|---|---|
| EP | 1318675 A | 6/2003 |
| JP | 11-133883 | 5/1999 |
| JP | 2000-227767 | 8/2000 |
| JP | 2003-029643 A | 1/2003 |
| JP | 2003-133837 A | 5/2003 |
| JP | 2003-150076 | 5/2003 |
| JP | 2003-186412 | 7/2003 |
| JP | 2004-085742 | 3/2004 |
| JP | 3110700 U | 5/2005 |
| JP | 2005-208384 | 8/2005 |

* cited by examiner

PANEL TYPE TELEVISION AND LCD TELEVISION

CROSS-REFERENCES TO RELATED APPLICATIONS

The present application is related to the Japanese Utility Model Application No. 2005-008747, filed Oct. 21, 2005, the entire disclosure of which is expressly incorporated by reference herein.

BACKGROUND OF THE INVENTION (1) Field of the Invention

The present invention relates to a wall mount structure and a panel securing plate structure for a panel type television such as an LCD television and a plasma type television.

(2) Description of Related Art

The flat display panel of a panel type television is mounted on the front panel from behind by means of a plate. For a large-sized panel type television, in particular, a display panel is mounted on the front cabinet by means of a plate that covers the entire display panel from behind.

Furthermore, since a panel type television is often used by hanging it on a wall, as well as standing it upright, for a small sized panel type television which is relatively light in weight, a wall mounting kit is attached by securing, to the rear cabinet, a plate member having a wall mount structure. However, a large sized panel type television, which often exceeds 20 kilograms in weight, is configured to attach a frame for wall mounting to the plate.

Japanese Patent Laid-Open No. 2000-227767 discloses a flat display panel wherein a flat panel is secured in opposite to a support plate and housed in a thin case formed by joining a front cover and a rear cover, and two circular pipe frames are arranged in a double cross by integrally fixing, in horizontal direction and vertically isolated from each other, to two vertical support plates laterally separated from each other.

Japanese Patent Laid-Open No. 2003-150076 discloses a display apparatus wherein an LCD panel are secured to a front cabinet by sandwiching the LCD panel between the front cabinet and each of center, left, and right stays.

Other reference document includes:
Japanese Utility Model Patent No. 3110700
Japanese Patent Laid-Open No. 1999-133883
Japanese Patent Laid-Open No. 2005-208384

The display panel of a large sized panel type television is mounted on the front cabinet with a plate that covers the entire display panel. However, unlike a CRT, the size and fixing method of a display panel differs with the manufacturer, and therefore it is difficult to mount a display panel with a plate as described above, and a display panel-specific plate part is needed. Moreover, since a plate part for a large sized display panel must also be large in size, and a few manufacturers have a machine to work plate parts, it is difficult to achieve cost reduction. In addition, the larger a plate part, the heavier its weight, making it disadvantageous in special tests such as drop test and vibration test.

BRIEF SUMMARY OF THE INVENTION

The present invention relates to sheet metal parts compatible with display panels with different sizes and/or mounting methods.

One aspect of the present invention provides an LCD television comprising: a backlight including an inverter circuit and a fluorescent lamp; an LCD panel that displays a picture on a screen; speakers that output a voice; a main substrate that receives a television broadcast signal, causes a picture to be displayed on the LCD panel and a voice to be output via the speakers; and a plastic cabinet that houses the LCD panel, the speakers, and the main substrate, wherein the main substrate contains a primary power supply circuit, wherein the LCD panel has a wide type with 16:9 aspect ratio and a screen size of 20 or 30 inch and is constructed such that: a metallic frame is mounted on a front and sides of the LCD panel so as to surround its view area; a metallic shield panel is mounted on a rear of the LCD panel so as to cover the rear; and a vertically long inverter circuit is disposed on the rear along the narrow side of the LCD panel, the LCD television further comprising: a top fixing plate and a bottom fixing plate that are disposed in parallel to the top and bottom of the frame for the LCD panel, and that can be screwed and fixed to the top and bottom of the frame; a substrate fixing plate made of a mesh panel that is fixed at the upper side of the bottom fixing plate by horizontally offsetting so as to avoid the side where the inverter circuit is disposed and that is constructed such that the lower end is disposed so as to almost contact the bottom fixing plate, while the upper end is arranged at a height out of reach of the top fixing plate; an auxiliary substrate that is screwed on the rear of the substrate fixing plate to the side opposite to the side where the inverter circuit is disposed and that performs processing not implemented by the main substrate; a main substrate being supported along with the auxiliary substrate on the rear of the substrate fixing plate by being placed near the side where the inverter circuit is disposed, the main substrate supplying DC drive power to the inverter circuit by having the primary power supply disposed close to the side where the inverter circuit is disposed; and a bridge plate including a pair of bridge parts mounted in parallel in a width direction apart from each other with a predetermine distance, and screwed to the top fixing plate and bottom fixing plate at their respective upper end part and lower end part, not interfering with the main substrate, forming a bridge projecting toward the rear, straddling over the primary power supply so as to secure a predetermined distance from the primary power supply circuit, and having a lower side bridge support part, an upper side bridge support part, and a bridge part connecting these bridge supports, wherein the lower bridge support part, the upper bridge support part, and the bridge part are formed by bending a sheet metal with thickness of 1.2 to 1.6 mm in bracket shape so that the width becomes 10 to 20 mm entirely, wherein the lower bridge support part and the upper bridge support part are made larger in depth of the bracket-shaped portion, the bridge part is made smaller in depth of the bracket-shaped portion and is offset toward the rear, and thereby a predetermined distance is secured at the point wherein the bridge straddles over the primary power supply circuit; and screw holes formed on the rear of the substrate fixing plate that enables fixing to a wall-mounting bracket of standardized size; the vertical length of the lower bridge support part is formed longer than the vertical length of the upper bridge support part, and the upper bridge support part having an oblong screw hole to allow the top fixing plate to be fixed to an upper fixing position and a lower fixing position; and the lower bridge support part has a screw hole formed that allows a stand bracket to be fixed, and wherein the cabinet being formed to cover most of the LCD panel so that the view area of the LCD panel is exposed toward the front and a pair of speakers are supported at the outward locations in width direction and below the bottom fixing plate; and wherein when the cabinet is fixed to the top fixing plate and bottom fixing plate, the bottom fixing plate has a screw boss at one location, and the top fixing plate has two screw boss at two locations that are mutually offset in width direction and vertical direction, and the top fixing plate also has two screw holes at locations that are offset in width direction.

Another aspect of present invention provides a panel type television comprising: a flat display panel that displays a picture on the screen; speakers to output a voice; a main substrate that receives television broadcast signals and causes pictures to be displayed on the flat display panel and voices to be output via the speakers; a plastic cabinet that houses the LCD panel, speakers, and main substrate; and a panel fixing device for fixing the flat display panel to the cabinet from the rear of the flat display panel, wherein: the panel fixing device includes: a top fixing member installed at the top of the rear surface of the flat display panel and is fixed to a front cabinet; a bottom fixing member that is mounted at the bottom of the rear surface of the flat display panel and fixed to the front cabinet, a substrate fixing member that covers about half of the rear surface of the flat display panel from the bottom fixing member upward, has a plurality of small holes formed therein and a bridge member fixed to an upper end of the top fixing member and an lower end of the bottom fixing member and bridges between the top fixing member and the bottom fixing member, and that has a wall-hanging structure, wherein on the substrate fixing member, a main substrate containing a primary power supply circuit and an auxiliary substrate not containing the primary power supply circuit are mounted, wherein in the rear of the flat display panel in the front cabinet, an inverter substrate containing an inverter circuit is mounted, and wherein a DVD drive is mounted between the top fixing member and top substrate fixing member on the rear surface of the flat display panel.

The top fixing member is mounted at the top of the rear surface of the flat display panel and the bottom fixing member is mounted at the bottom of the rear surface, and the substrate fixing member having a plurality of small holes is mounted so that almost half of the rear surface of the flat display panel from the bottom fixing member upward. Then the top fixing member and bottom fixing member are mounted on the front cabinet. Then, the top fixing member and bottom fixing member are connected by bridging between an upper end of the top fixing member and a lower end of the bottom fixing member with the bridge member having wall-hanging structure. Also, on the substrate fixing member, a main substrate containing a primary power supply circuit and an auxiliary substrate not containing the main power supply are mounted, an inverter substrate is mounted on the rear of the flat display panel in the front cabinet, and a DVD drive is mounted between the top fixing member and substrate fixing member on the rear surface of the flat display panel.

Here, as the panel fixing device, it is sufficient to be able to fix the flat display panel by means of the top fixing member, top fixing member, substrate fixing member, and bridge member. Also, as the top fixing member, any shaped member (stick, plate, hook, etc.) may be employed as long as it supports the flat display panel from above. Also, various metals or plastics may be used as its materials. As for materials and shapes of the bottom fixing member, similar materials and shapes to those for the top fixing member can be used. Furthermore, the bridge member may be of any material or shape as long as it is able to connect and hold the top fixing member and bottom fixing member and also to support overall weight of the panel type television by means of wall-hanging structure. Also, as the substrate fixing member, one of any shape and material may be used as long as it has a sufficient size and structure to allow the mounting of the main substrate and auxiliary substrate.

According to the present invention configured as described above, it is not necessary to produce different parts for different flat-panel manufactures, thus allowing increased evaluation time for one metal mold and achieving decreased cost. As a benefit for workers, the same work procedure is used for different panels and consequently workability is improved. Furthermore, separating a part decreases the material and makes a part lighter, which is advantageous in special tests such as drop test and vibration tests. Also, since the wall-hanging structure is independent of the back cabinet, it is possible to provide a strong wall-hanging structure and make it one of the panel fixing members, resulting in decreased number of parts. Separating the panel fixing member realizes smaller parts and thereby allows even manufacturers having no large machines to produce parts. This allows more competitive prices to be offered and also enables production with small machines, thus eliminating parts delivery delay and reducing defective parts. Also, since a panel is not covered entirely with a plate, the radiation efficiency for heat from a panel increases and temperatures within the television drops.

An optional aspect of present invention provides a panel type television, wherein the height of the bridge member is larger that the heights of the main substrate and the auxiliary substrate, and the bridge support width in the longitudinal direction is longer that the bridge width in the cross direction.

In this aspect configured as described above, since height of the bridge member is larger that height of a substrate, it is easier to mount a substrate to the substrate fixing member.

Another optional aspect of present invention provides a panel type television, wherein the bridge member is screwed to the top fixing member and the bottom fixing member, and a screw hole formed in the bridge member used for screwing the bridge member to the top fixing member is vertically oblong.

In this aspect configured as described above, making the screw hole vertically oblong on the top member side of the bridge member allows the same bridge member to be used for different-sized flat display panels.

Another optional aspect of present invention provides a panel type television, wherein the front cabinet has speakers at the lower side of the flat panel.

In this aspect configured as described above, it is possible to dispose speakers near the main substrate, making the wiring easier.

Another optional aspect of present invention provides a panel type television, wherein the flat display panel is a 20 to 35 inch LCD panel.

In this aspect configured as described above, it is possible to provide a wall-hanging structure even for 20 to 35 inch televisions for which forming a wall-hanging structure directly has been impossible so far.

Another optional aspect of present invention provides a panel type television, wherein the bridge member is formed by bending a sheet metal so that the thickness becomes 1.2 to 1.6 mm and longitudinal width becomes 10 to 20 mm.

In this aspect configured as described above, it is possible to obtain sufficient strength by bending a sheet metal even if a thinner sheet metal is used, and also make it easier to fix substrates to the substrate fixing member by narrowing the longitudinal width.

These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

Referring to the drawings in which like reference character (s) present corresponding parts throughout.

DETAILED DESCRIPTION OF THE INVENTION

The detailed description set forth below in connection with the appended drawings is intended as a description of presently preferred embodiments of the invention and is not intended to represent the only forms in which the present invention may be constructed and or utilized.

Figure 1:
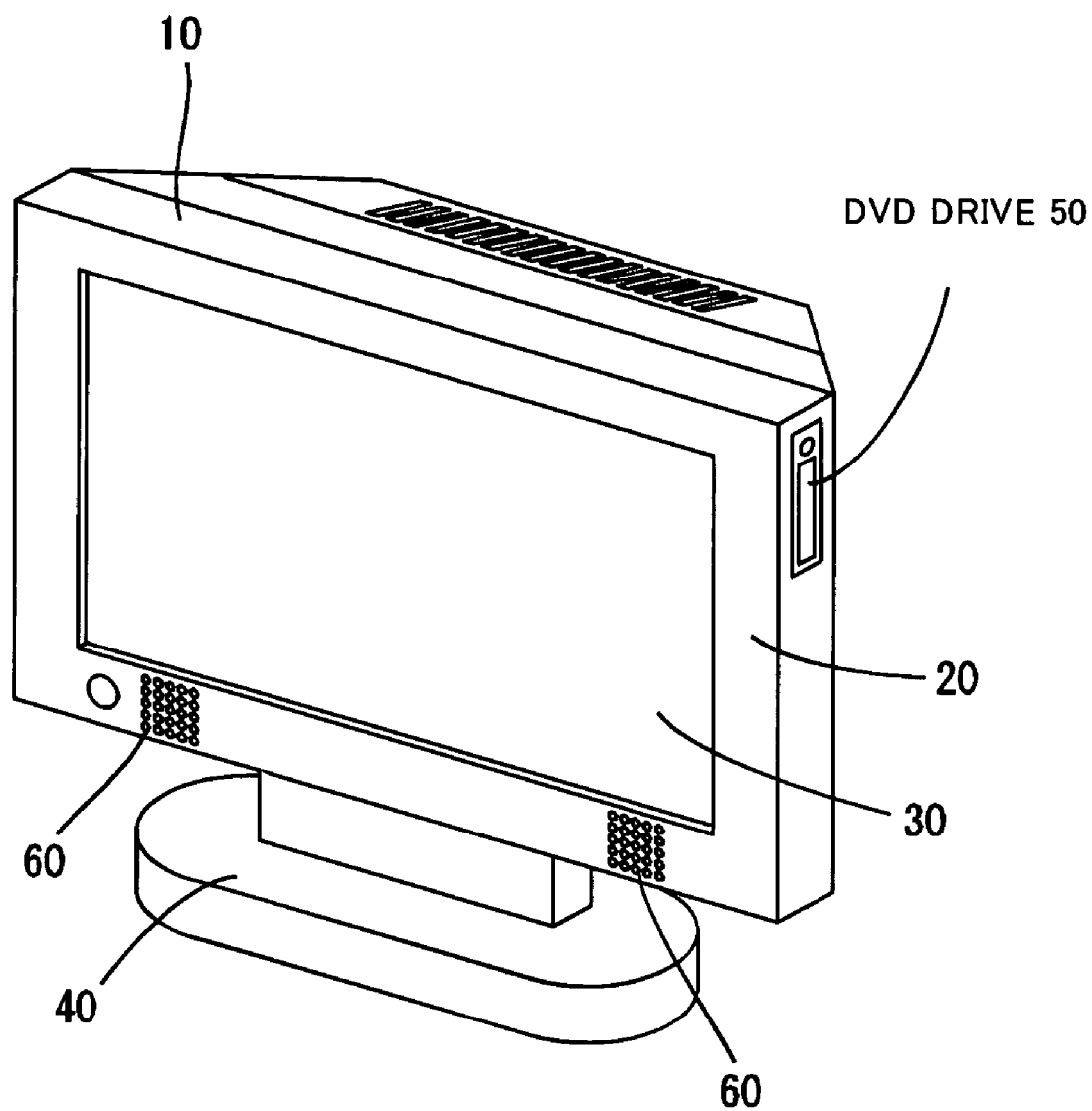
FIG. 1 is an exemplary illustration of a front perspective view of a panel type television.

Preferred embodiments of the present invention are described below in the following order:

1. The configuration of a panel type television according to the present invention 2. The structure and advantages of a panel fixing plate 3. Summary 1. FIG. 1 is a front perspective view of a panel type television. In this figure, a panel type television 10 is composed of a cabinet 20, an LCD panel 30 to display pictures on the screen, and a leg 40. The cabinet 20 holds the LCD panel 30 so that its display surface is exposed toward the front of the panel type television 10. The leg 40 supports the cabinet 20 and thereby holds the display surface of the LCD panel 30 in a rough vertical position.

The LCD panel 30 is approximately 20 to 35 inches in size and is equipped with a backlight to illuminate the LCD panel from behind. In addition, a metal frame is disposed at the front and sides of the LCD panel to enclose the view area. The back surface is covered with a metallic shield panel, and an inverter substrate 160 on which an oblong inverter circuit is mounted is disposed that is positioned vertically along one narrow side of the LCD panel.

Figure 2:
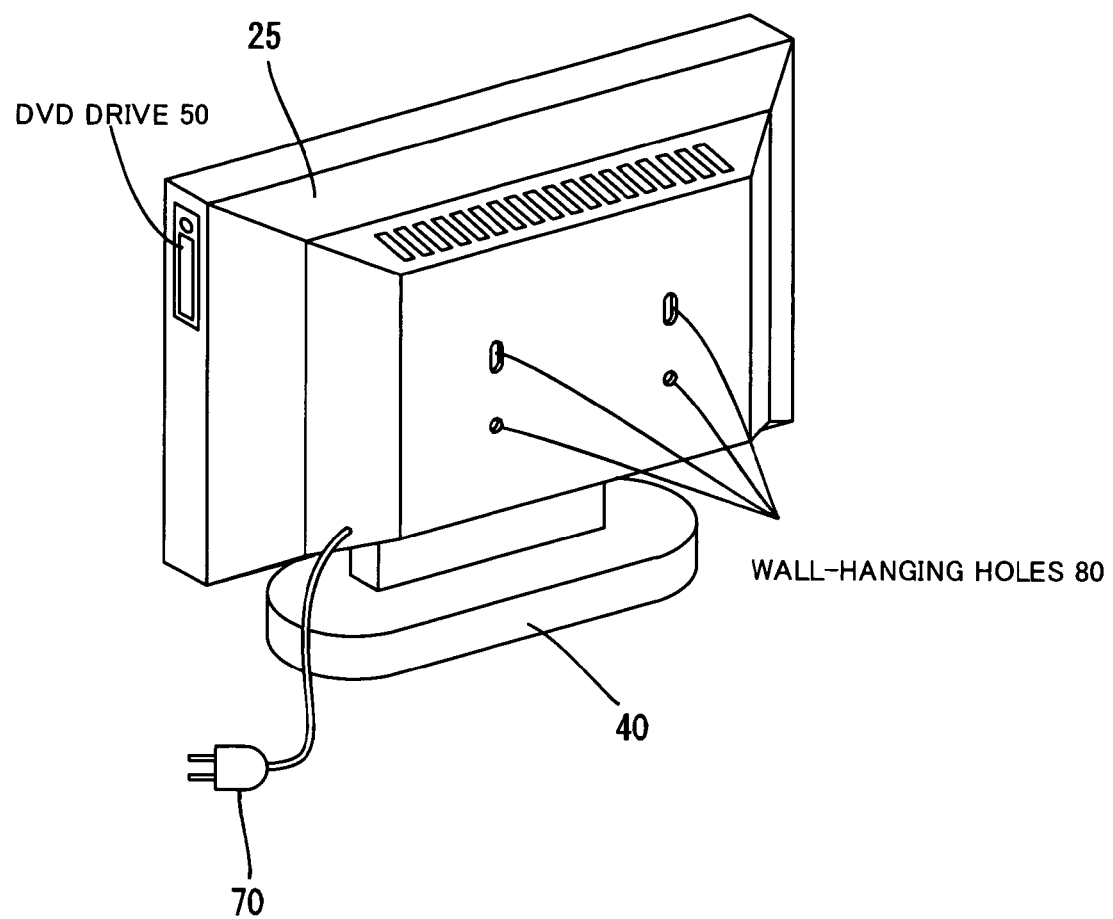
FIG. 2 is an exemplary illustration of a rear perspective view of a panel type television.

FIG. 2 is a rear perspective view of the panel type television 10. In this figure, the cabinet 20 at the rear of the panel type television 10 is formed so that its central portion is thicker, and has wall-hanging holes in its back. In the hollow space inside the cabinet, various substrates and a DVD drive 50 are disposed. For example, the DVD drive 50 is disposed near the upper left corner viewed from back, and when an optical disk is inserted into the DVD slot, the DVD drive 50 can read the data on the optical disk. Although a slot-in type DVD drive is used in this embodiment, other types of DVD drives, a non-limiting example of which may be a disk tray type DVD drive may also be used.

As shown in FIG. 1, the front cabinet 20 has the view area exposed toward the front, and together with a back cabinet 25, covers the panel type television almost entirely. Near the upper right corner of the front cabinet, a rectangular slot is provided for putting in and out an optical disk. Inside the front cabinet and at the bottom of the LCD panel 30, a pair of speakers 65 are disposed on either side across the width, and a speaker grille 60 consisting of multiple small holes is formed in the front cabinet where each speaker is disposed. In addition, inside the front cabinet, bosses are formed for screwing together a panel top fixing plate 110 and a panel bottom fixing plate 120 (described later). In order to secure an LCD panel of various sizes to the front cabinet, one boss is provided for the panel bottom fixing plate 120 so that the panel bottom fixing plate 120 is fixed at one point, and two bosses are provided at two points which are horizontally and vertically offset from each other, for the panel top fixing plate 110 so that the panel top fixing plate 110 is fixed at two point.

The back cabinet 25 has wall-hanging holes 80 that are formed at the positions corresponding to the bridge plates 100 disposed inside the back cabinet. If made of plastic and if the weight of a television exceeds 20 kilograms, the back cabinet alone cannot support the television, and consequently the back cabinet may break. Therefore, the bridge plates 100 is disposed at the inside corresponding position, and the television is supported by the bridge plates 100. Although these wall-hanging holes 80 are circular holes consisting of each two vertically arranged holes on either side, any number of holes may be formed as long as they correspond to the position of the inside bridge plates 100 and the number of wall-hanging structures formed on this plate, and the holes may be of any shape, non-limiting examples of which may include triangle or rectangle.

Figure 3:
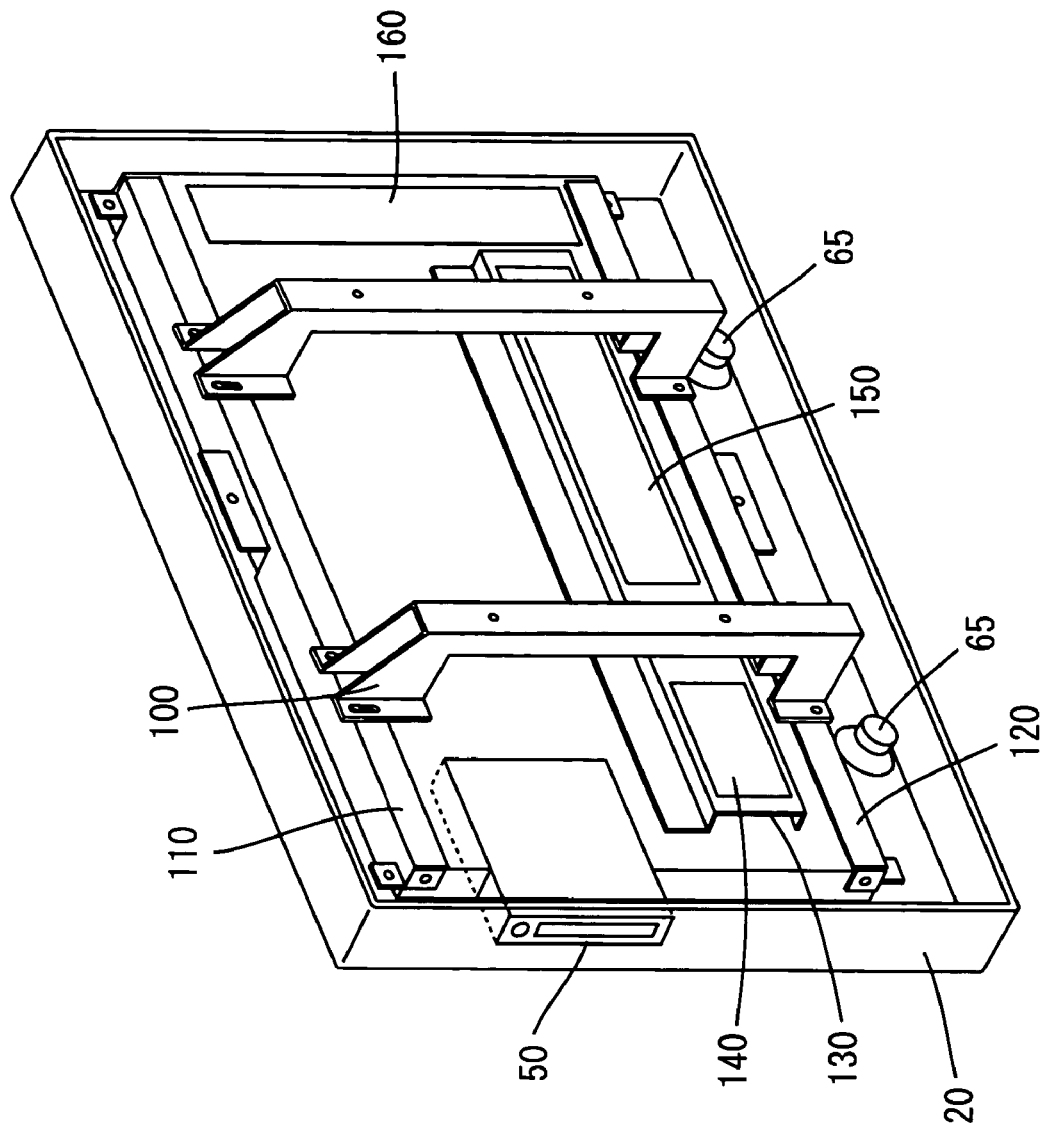
FIG. 3 is an exemplary illustration of a rear perspective view of a panel type television with the rear cabinet removed.

FIG. 3 shows an internal perspective view of a panel type television with the back cabinet 25 removed. To the LCD panel 30, the panel top fixing plate 110 is screwed at its top and the panel bottom fixing plate 120 is screwed at its bottom. Then, the LCD panel 30 is secured to the front cabinet through screw holes for front cabinet 114 formed at a plurality of portions each projecting up and down from the panel top fixing plate and the panel bottom fixing plate. Although the thickness and width of the LCD panel 30 differs with the manufacturer, using the separated panel fixing plates allows LCD panels of different sizes to be accommodated. Although the LCD panel 30 is illustrated and described as a flat display panel in this embodiment, any display panel, non-limiting example of which may include a plasma display panel may be used. Further, the panel fixing plate may be used at the left and right side as needed, in addition to the upper and lower sides.

The two bridge plates 100 mounted inside the back cabinet 25 and used for wall-hanging as well are each vertically disposed on either side, and screwed to the panel top fixing plate 110 at their upper ends and to the panel bottom fixing plate 120 at their lower ends. On the front cabinet 20, bosses for screwing a panel top fixing member 110 and panel bottom fixing member 120 are formed facing the cabinet surface. The bosses for screwing the panel bottom fixing plate 120 to the front cabinet are formed, one for each screw hole, and the bosses for screwing the panel top fixing plate 110 to the front cabinet 20 are formed, two for each screw hole. The panel top fixing plate 110 constitutes the top fixing member, the panel bottom fixing plate 120 constitutes the bottom fixing member, and the bridge plate 100 constitutes the bridge member.

Figure 10:
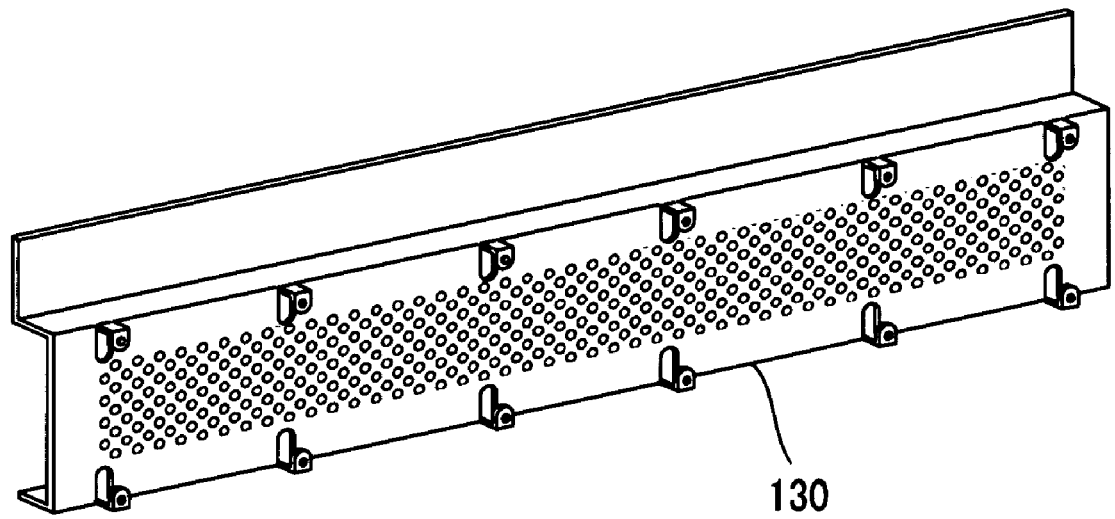
FIG. 10 is an exemplary illustration of a perspective view of a substrate installing plate.

Furthermore, a substrate mounting plate 130 for mounting various substrates is disposed at the rear lower side of the LCD panel 30, and covers substantially the lower half of the rear of the LCD panel, keeping clear of the area where the inverter substrate 160 is disposed. FIG. 10 shows a perspective view of the substrate mounting plate 130. The substrate mounting plate 130 is formed so that upper end thereof almost contacts the panel bottom fixing plate 120 and the lower end thereof does not reach the panel top fixing plate 110. In addition, the substrate mounting plate 130 is a mesh panel in which multiple circular holes are formed to radiate the heat generated by the LCD panel 30.

On the substrate mounting plate 130, a main substrate 150 is fixed with screws near the inverter substrate 160 located at the center viewed from the back, and an auxiliary substrate 140 is fixed with screws opposite to the inverter substrate 160 located to the left. The circuits mounted on the main substrate 150 include a tuner circuit, an image data generation circuit, a panel drive circuit, primary and secondary power supply circuits, and a microcomputer. The primary power supply circuit is disposed near the inverter substrate 160 and supplies a DC drive voltage to the inverter circuit. Mounted on the auxiliary substrate 140 are circuits that perform the processing not embodied by the main substrate 150, such as an MPEG decoder that performs a signal processing for digital data inputted from the DVD drive 50.

Furthermore, at the right side of the rear of the LCD panel 30, an inverter substrate 160 is disposed that has an inverter circuit to supply power to the backlight of the LCD panel 30. The substrate mounting plate 130 constitutes a substrate fixing member. In addition, the panel top fixing plate 110, panel bottom fixing plate 120, the bridge plate 100, and the substrate mounting plate 130 constitutes a panel fixing device.

Figure 8:
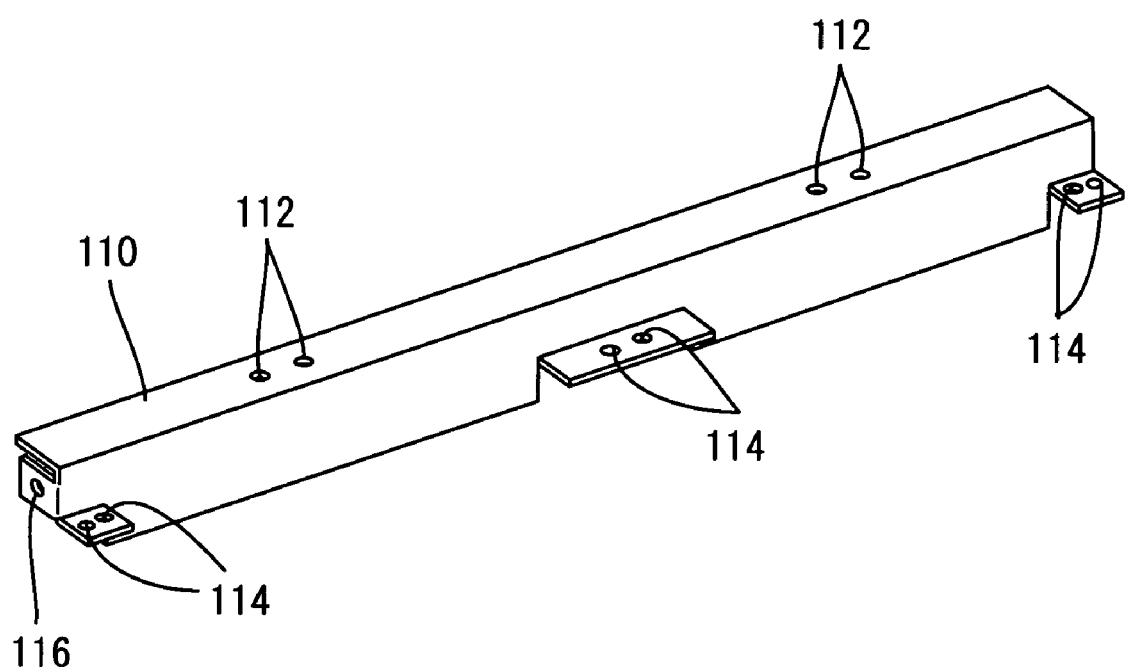
FIG. 8 is an exemplary illustration of a perspective view of a panel top fixing plate.

2. The structure and advantages of panel fixing plates:

FIG. 8 is a perspective view of the panel top fixing plate. The panel top fixing plate 110 is formed in L shape, placed over the corner between the top and rear surface of the LCD panel 30, and secured to it. Projecting portions in the form of eaves are formed by bending the middle part and the left and right ends of the panel top fixing plate 110 that contacts the top of the LCD panel 30. Screw holes 114 is provided on each projecting portion for securing the panel top fixing plate to the front cabinet. Screw holes 114 are formed at two locations offsetting with the width direction so that the panel top fixing plate 110 can be screwed to the two bosses formed on the front cabinet 20. Screw holes 116 are also formed on the projecting portions extending from the top to both sides of the LCD panel, and holes 116 are used to secure the panel top fixing plate to the LCD panel 30. Furthermore, at the area contacting the rear surface of the LCD panel 30, two laterally arranged screw holes 112 for securing the bridge plate 100 are formed at a position where the panel top fixing plate 110 is roughly trisected.

Figure 9:
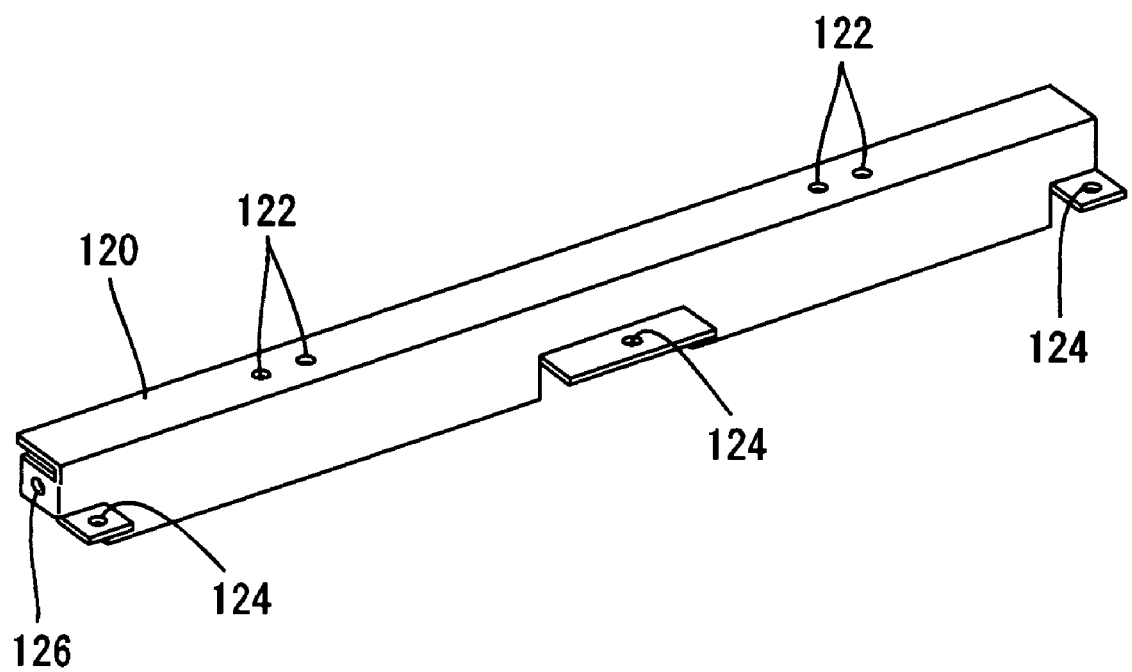
FIG. 9 is an exemplary illustration of a perspective view of a panel bottom fixing plate.

FIG. 9 is a perspective view of the panel bottom fixing plate. The panel bottom fixing plate 120 is similar in shape to the panel top fixing plate 110, with screw holes 124 for securing the plate 120 to the front cabinet 20, screw holes 126 for securing the plate 120 to the LCD panel 30, and screw holes 122 for securing the bridge plate 100 formed therein to the plate 120, and is fixed over the corner between the bottom side and rear surface of the LCD panel 30 in rough contact. Like the panel top fixing plate 110, screw holes 124 for securing to the front cabinet are provided at the projecting portions bent like eaves from the middle part and the left and right ends that contact the bottom of the LCD panel, but, unlike the panel top fixing plate 110, one screw hole is formed at each location.

Figure 4:
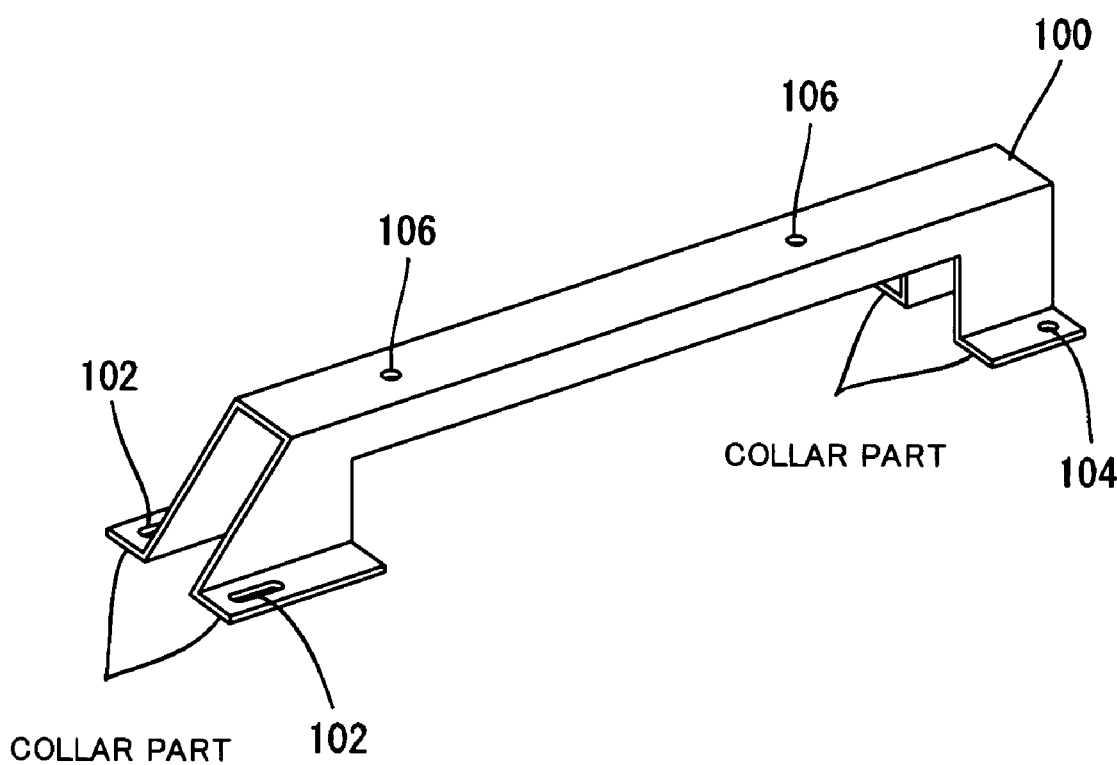
FIG. 4 is an exemplary illustration of a perspective view of a bridge plate.
Figure 5:
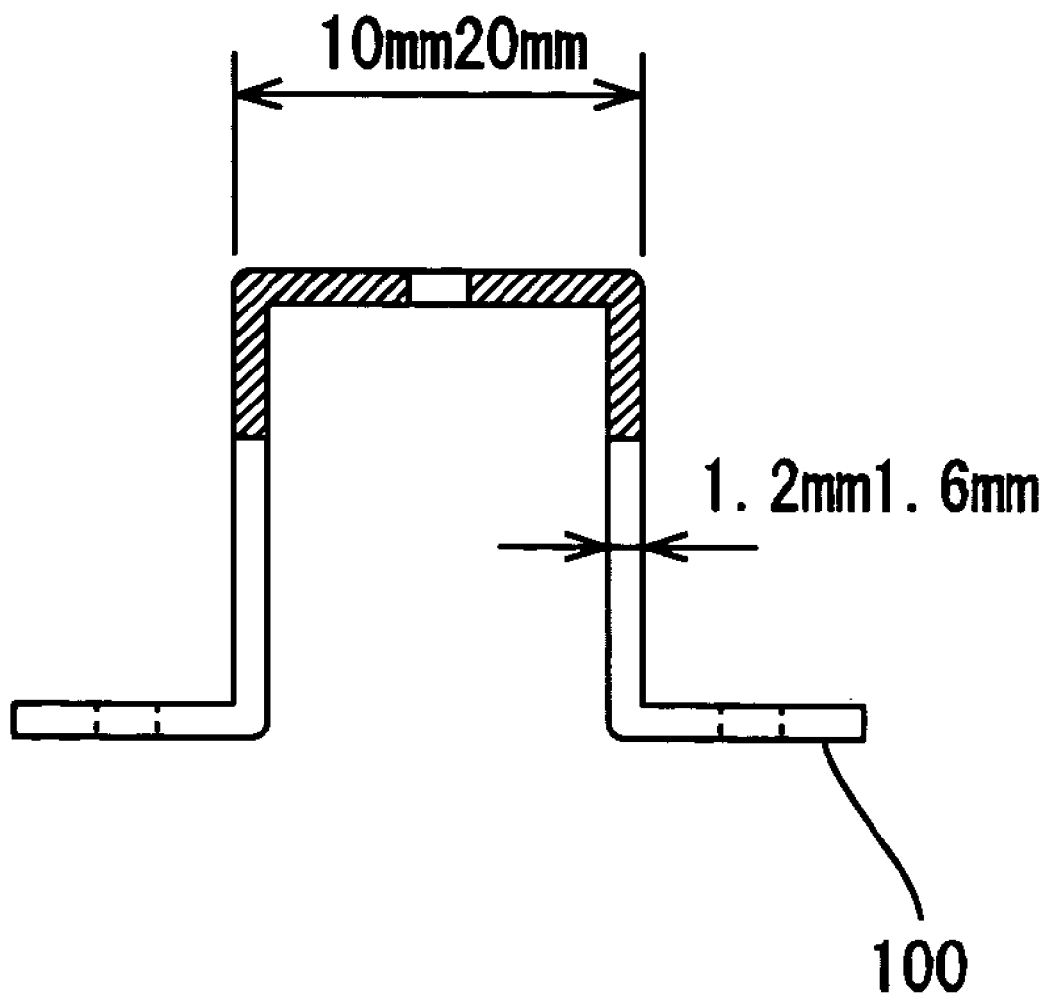
FIG. 5 is an exemplary illustration of a cross-sectional view of a bridge plate.
Figure 6:
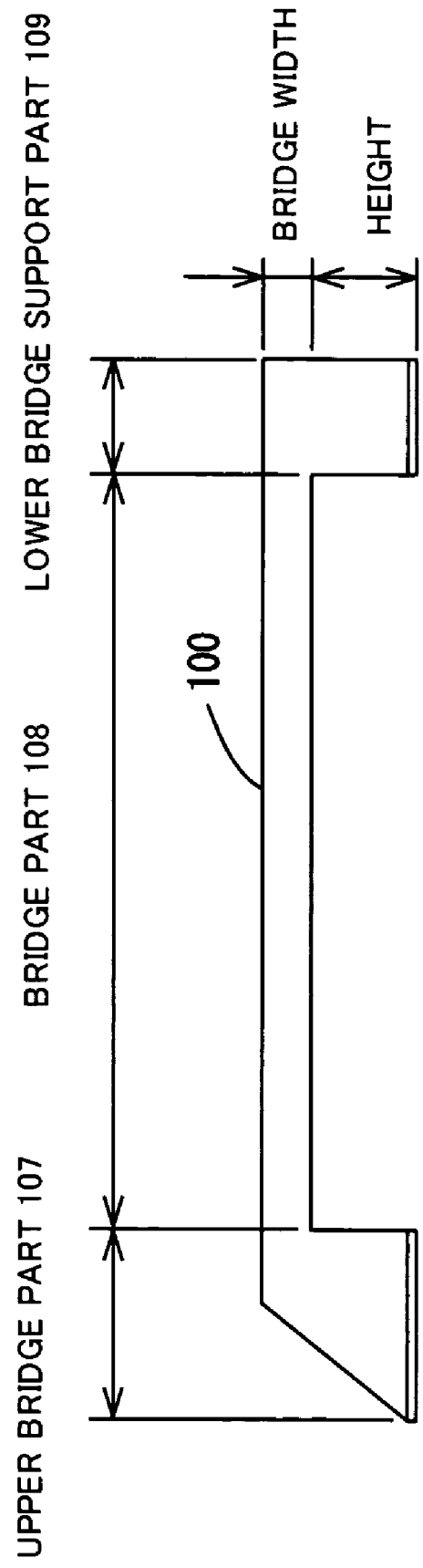
FIG. 6 is an exemplary illustration of a side view of a bridge plate.
Figure 7:
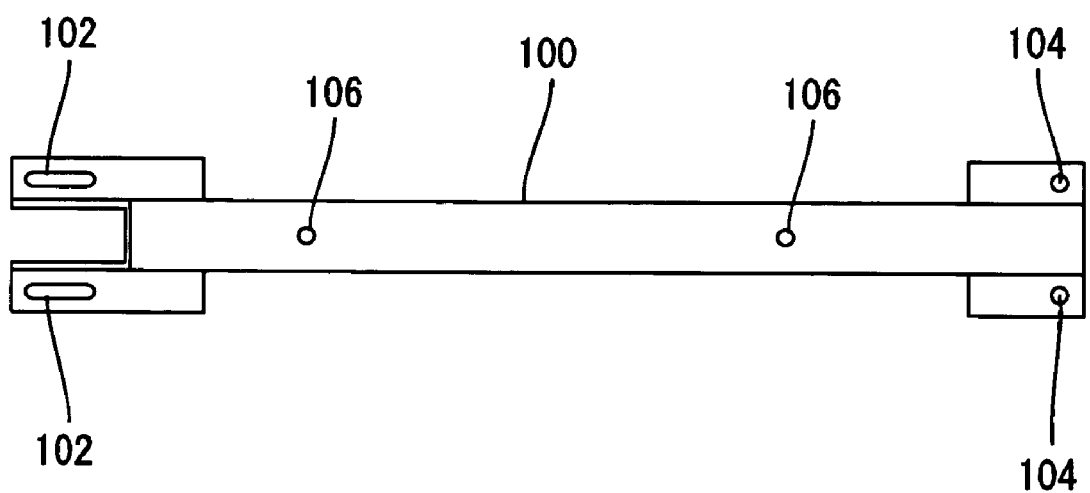
FIG. 7 is an exemplary illustration of a top view of a bridge plate.

Now, the structure of the bridge plates 100 is described with reference to FIGS. 4 through 7. FIG. 4 is an exemplary perspective view, FIG. 5 is an exemplary cross-sectional view, FIG. 6 is an exemplary side view, and FIG. 7 is an exemplary top view of the bridge plate 100. The bridge plates 100 may generally be formed by bending a sheet metal into bracket shape, and made up of upper bridge support part 107, bridge part 108, and lower bridge support part 109 so that the bridge part 108 straddles over the substrate mounting plate 130. The bridge plates 100 are formed by bending a sheet metal into bracket shape, and both bridge support parts are bent further outward like a hat to form a collar part.

The height of the bridge part 108 is higher than the height of any substrate mounted on the substrate mounting plate 130, and has a shape of bridge projecting toward the rear of the panel type television 10 and straddling over the substrate mounting plate 130 so that the bridge plate 100 will not interfere with the main substrate 150 and also a predetermined distance can be kept from the primary power supply circuit. By forming the upper bridge support part 107 and lower bridge support part 109 to have a larger depth in the bracket-shaped portion, and forming the bridge part 108 to have a smaller depth in the bracket-shaped portion and offset toward the rear of the flat-panel television 10, the predetermined distance can be secured at the portion where the bridge part 108 straddles over the main substrate 150 containing the primary power circuit.

Also, the vertical length of the lower bridge support part 109 in FIG. 6 is formed to be longer than that of the upper bridge support part 107. Therefore, the strength of the upper bridge support part 107 and lower bridge support part is increased that are connected to the panel top fixing plate 110 and panel bottom fixing plate 120 respectively. This configuration makes it possible to strongly support the panel top fixing plate 110 and panel bottom fixing plate. Moreover, a screw hole is formed in the lower bridge support part to allow a stand bracket to be fixed.

The collar portions of both bridges have screw holes 102 and 104 for screwing to the panel top fixing plate of the collar portion of the upper bridge support part. The screw holes 102 are vertically oblong, and the screw holes 104 for screwing to the panel bottom fixing plate for the collar portion of the lower bridge support part are circular. The reason for the oblong shape of the screw holes 102 is that the same bridge plate 100 can be used for LCD panels of different sizes, the advantages being described later. The size of an oblong hole to accommodate an LCD panel of one inch larger or smaller in size should be longer than the change in the height of the LCD panel 30 when LCD panel's number of inches is changed by one inch. Generally the number of inches of an LCD television or a plasma display television indicates the length of the diagonal line across the screen, and if aspect ratio is the same, a change in height is constant when the LCD panel's number of inches changes by one inch. The change in height is typically about 1.25 cm (for aspect ratio of 9:16) to 1.52 cm (for aspect ratio of 3:4).

Also, on the rear of the bridge part 108, wall-hanging holes 106 for a standardized wall-hanging bracket are formed at positions corresponding to the wall-hanging holes of the back cabinet 25. The wall-hanging hole 106 may be a screw hole or circular or oblong hole. The wall-hanging hole 106 may be formed at one location or two or more locations, like the wall-hanging hole 80 of the back cabinet. Although thickness of the sheet metal used to form the bridge plate 100 is approximately 1.2 mm to 1.6 mm and width of the back of the bridge part 108 is approximately 10 mm to 20 mm in this exemplary embodiment, any thickness and width may be possible as long as they can support the weight of the panel type television 10.

The panel top fixing plate 110 roughly contacts the top and rear surface of the LCD panel 30 and is screwed to the LCD panel 30 through the panel screw hole 116. The panel bottom fixing plate 120 roughly contacts the bottom and rear surface of the LCD panel 30 and is screwed to the LCD panel 30 through the panel screw hole 126. By means of the two bridge plates 100, the bridge plate screw hole 112 of the panel top fixing plate 110 and the panel screw hole top fixing plate 102 of the bridge plate 100 are fixed together. The bridge plate screw hole 122 of the panel bottom fixing plate 120 and the panel screw hole bottom fixing plate 104 are fixed together, and are bridged across and screwed to the LCD panel. The panel top fixing plate 110, panel bottom fixing plate 120, and two bridge plates 100 are combined to secure the LCD panel 30 to the front cabinet 20 and hold them.

The frame structure presented provides a strength to the bridge plate 100 to support not only the panel top fixing plate 110, panel bottom fixing plate 120, and LCD panel 30 but also all the other parts of the LCD television 100, thus making it possible to use the bridge plate 100 as a wall-hanging frame that supports the weight of the LCD television 10 by means of the wall-hanging screw holes 106.

Figure 11:
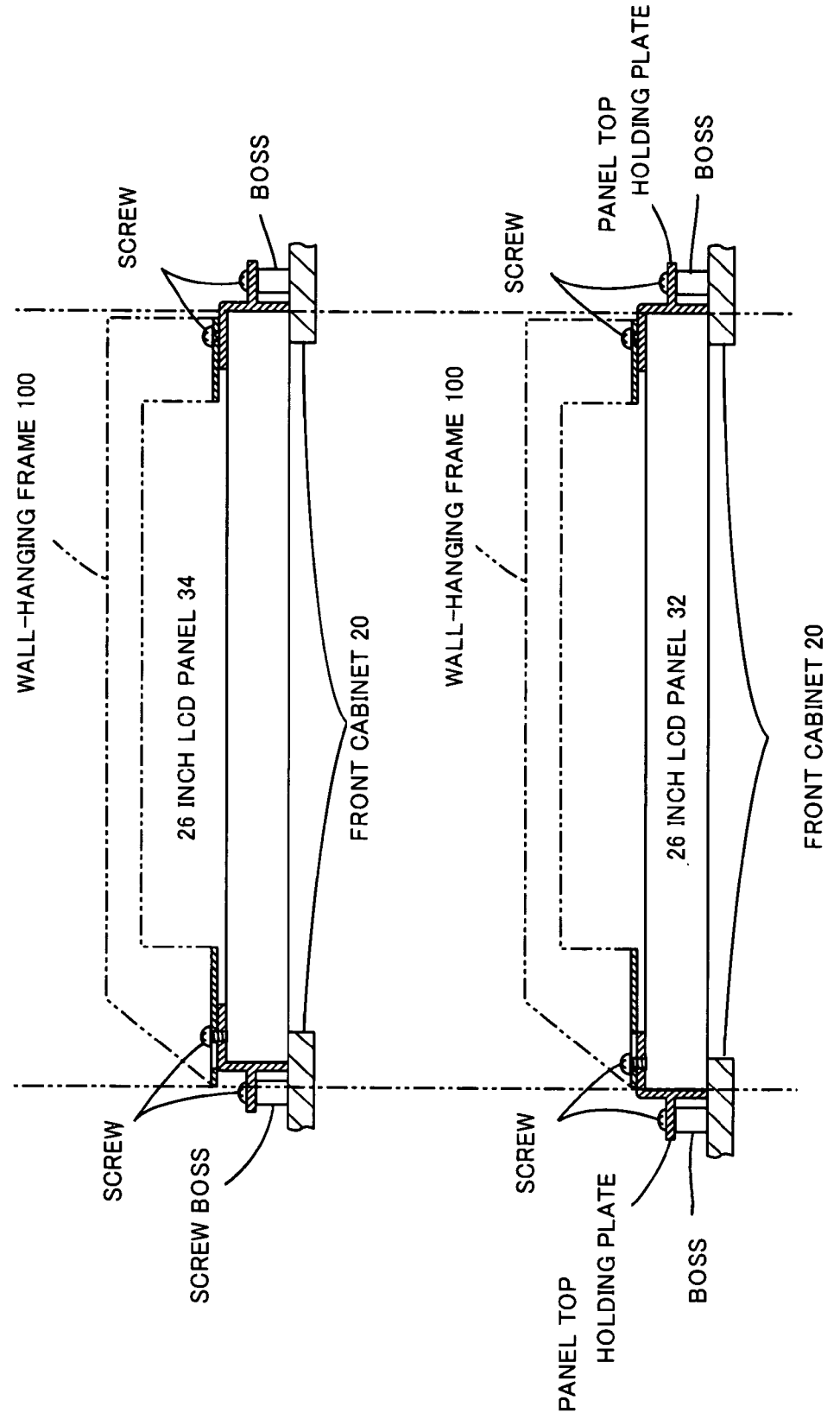
FIG. 11 is an exemplary illustration of an illustration of a mounting hole for a bridge plate.

FIG. 11 illustrates how to mount an exemplary 26 inch LCD panel and an exemplary 27 inch LCD panel to their front cabinet using the same panel mounting plate. In this figure, the same shaped panel top fixing plate 110, panel bottom fixing plate 120, and bridge plate 100 are used for the exemplary 26 inch LCD panel 34, and the exemplary 27 inch LCD panel 32. Since the screw hole in the collar of the lower bridge support part 109 of the bridge plate 100 is circular, both 26 inch and 27 inch LCD panels are screwed to the front cabinet in the same manner. However, as the location of boss screw hole is different between 26 inch and 27 inch LCD panels, it is necessary to compensate for this difference.

On the other hand, since the screw hole in the collar of the upper bridge support part 107 of the bridge plate 100 is oblong and longer than the difference in height between the 26 inch and 27 inch LCD panels and it is possible to use upper and lower fixing positions, as described above, left end of the oblong hole is used for the 27 inch LCD panel and right end of the oblong hole is used for the 26 inch LCD panel in FIG. 11. This overcomes the difference in size between LCD panels of different inches.

3. Summary:

With the present invention, the display panel fixing plate is separated into the panel top fixing plate 110, the panel bottom fixing plate 120, and the bridge plate 100. The panel top fixing plate 110 is mounted on the top of the flat display panel 30 and the panel bottom fixing plate 120 to the bottom of the flat display panel, and both fixing plates are held with the two bridge plates 100. Moreover, by making the screw hole for screwing the bridge plate 100 to the panel top fixing plate 110 vertically oblong, it is possible to use the same panel top fixing plate, panel bottom fixing plate, and bridge plate for display panels with one inch or more different sizes.

The present invention is not limited to the above-described embodiment. Those skilled in the art will naturally understand that the following are disclosed as an exemplary embodiment of the present invention:

the combination of mutually replaceable members, configurations, etc. disclosed in the above embodiments may be changed and applied as appropriate;

the combination of members, configurations, etc. that are not disclosed in the above embodiment but are known arts and replaceable with members, configurations, etc. disclosed in the above embodiments may be replaced or changed and applied as appropriate; and the combination of members, combinations, etc. that are not disclosed in the above embodiments but are conceivable as substitutes by those skilled in the art based on known arts for members, configurations, etc. disclosed in the embodiments may be replaced or changed and applied as appropriate.

Although the invention has been described in considerable detail in language specific to structural features and or method acts, it is to be understood that the invention defined in the appended claims is not necessarily limited to the specific features or acts described. Rather, the specific features and acts are disclosed as preferred forms of implementing the claimed invention. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, proximal, distal, etc. have been used for convenience purposes only and are not intended to imply any particular fixed direction or orientation. Instead, they are used to reflect relative locations and/or directions/orientations between various portions of an object.

What is claimed is:

1. An LCD television comprising:
   a backlight including an inverter circuit and a fluorescent lamp;
   an LCD panel that displays a picture on a screen;
   speakers that output a voice;
   a main substrate that receives a television broadcast signal, causes a picture to be displayed on the LCD panel and a voice to be output via the speakers; and
   a plastic cabinet that houses the LCD panel, the speakers, and the main substrate,
   wherein
   the main substrate contains a primary power supply circuit,
   wherein
   the LCD panel has a wide type with 16:9 aspect ratio and a screen size of 20 or 30 inch and is constructed such that: a metallic frame is mounted on a front and sides of the LCD panel so as to surround its view area; a metallic shield panel is mounted on a rear of the LCD panel so as to cover the rear; and a vertically long inverter circuit is disposed on the rear along the narrow side of the LCD panel, the LCD television further comprising:
   a top fixing plate and a bottom fixing plate that are disposed in parallel to the top and bottom of the frame for the LCD panel, and that can be screwed and fixed to the top and bottom of the frame;

a substrate fixing plate made of a mesh panel that is fixed at the upper side of the bottom fixing plate by horizontally offsetting so as to avoid the side where the inverter circuit is disposed and that is constructed such that the lower end is disposed so as to almost contact the bottom fixing plate, while the upper end is arranged at a height out of reach of the top fixing plate;

an auxiliary substrate that is screwed on the rear of the substrate fixing plate to the side opposite to the side where the inverter circuit is disposed and that performs processing not implemented by the main substrate;

a main substrate being supported along with the auxiliary substrate on the rear of the substrate fixing plate by being placed near the side where the inverter circuit is disposed, the main substrate supplying DC drive power to the inverter circuit by having the primary power supply disposed close to the side where the inverter circuit is disposed; and a bridge plate including
  a pair of bridge parts mounted in parallel in a width direction apart from each other with a predetermine distance, and screwed to the top fixing plate and bottom fixing plate at their respective upper end part and lower end part, not interfering with the main substrate, forming a bridge projecting toward the rear, straddling over the primary power supply so as to secure a predetermined distance from the primary power supply circuit, and having a lower side bridge support part, an upper side bridge support part, and a bridge part connecting these bridge supports, wherein the lower bridge support part, the upper bridge support part, and the bridge part are formed by bending a sheet metal with thickness of 1.2 to 1.6 mm in bracket shape so that the width becomes 10 to 20 mm entirely, wherein the lower bridge support part and the upper bridge support part are made larger in depth of the bracket-shaped portion, the bridge part is made smaller in depth of the bracket-shaped portion and is offset toward the rear, and thereby a predetermined distance is secured at the point wherein the bridge straddles over the primary power supply circuit; and screw holes formed on the rear of the substrate fixing plate that enables fixing to a wall-mounting bracket of standardized size;

the vertical length of the lower bridge support part is formed longer than the vertical length of the upper bridge support part, and the upper bridge support part having an oblong screw hole to allow the top fixing plate to be fixed to an upper fixing position and a lower fixing position; and the lower bridge support part has a screw hole formed that allows a stand bracket to be fixed, and wherein
the cabinet being formed to cover most of the LCD panel so that the view area of the LCD panel is exposed toward the front and a pair of speakers are supported at the outward locations in width direction and below the bottom fixing plate; and wherein when the cabinet is fixed to the top fixing plate and bottom fixing plate, the bottom fixing plate has a screw boss at one location, and the top fixing plate has two screw boss at two locations that are mutually offset in width direction and vertical direction, and the top fixing plate also has two screw holes at locations that are offset in width direction.

2. A panel type television comprising:
a flat display panel that displays a picture on the screen;
speakers to output a voice;
a main substrate that receives television broadcast signals and causes pictures to be displayed on the flat display panel and voices to be output via the speakers;
a plastic cabinet that houses the LCD panel, speakers, and main substrate; and
a panel fixing device for fixing the flat display panel to the cabinet from the rear of the flat display panel, wherein:
the panel fixing device includes:
a top fixing member installed at the top of the rear surface of the flat display panel and is fixed to a front cabinet;
a bottom fixing member that is mounted at the bottom of the rear surface of the flat display panel and fixed to the front cabinet,
a substrate fixing member that covers about half of the rear surface of the flat display panel from the bottom fixing member upward, has a plurality of small holes formed therein and a bridge member fixed to an upper end of the top fixing member and an lower end of the bottom fixing member and bridges between the top fixing member and the bottom fixing member, and that has a wall-hanging structure,
wherein
on the substrate fixing member, a main substrate containing a primary power supply circuit and an auxiliary substrate not containing the primary power supply circuit are mounted,
wherein
in the rear of the flat display panel in the front cabinet, an inverter substrate containing an inverter circuit is mounted, and
wherein
a DVD drive is mounted between the top fixing member and top substrate fixing member on the rear surface of the flat display panel.

3. A panel type television according to claim 2, wherein the height of the bridge member is larger that the heights of the main substrate and the auxiliary substrate, and the bridge support width in the longitudinal direction is longer that the bridge width in the cross direction.

4. A panel type television according to claim 2, wherein the bridge member is screwed to the top fixing member and the bottom fixing member, and a screw hole formed in the bridge member used for screwing the bridge member to the top fixing member is vertically oblong.

5. A panel type television according to claim 2, wherein the front cabinet has speakers at the lower side of the flat panel.

6. A panel type television according to claim 2, wherein the flat display panel is a 20 to 35 inch LCD panel.

7. A panel type television according to claim 2, wherein the bridge member is formed by bending a sheet metal so that the thickness becomes 1.2 to 1.6 mm and longitudinal width becomes 10 to 20 mm.

* * * * *